United States Patent
Xu et al.

(10) Patent No.: US 11,989,933 B2
(45) Date of Patent: May 21, 2024

(54) POLYNOMIAL CONVOLUTIONAL NEURAL NETWORK WITH LATE FAN-OUT

(71) Applicant: CARNEGIE MELLON UNIVERSITY, Pittsburgh, PA (US)

(72) Inventors: Felix Juefei Xu, Pittsburgh, PA (US); Marios Savvides, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 475 days.

(21) Appl. No.: 16/976,412

(22) PCT Filed: Apr. 29, 2019

(86) PCT No.: PCT/US2019/029635
§ 371 (c)(1),
(2) Date: Aug. 27, 2020

(87) PCT Pub. No.: WO2019/210300
PCT Pub. Date: Oct. 31, 2019

(65) Prior Publication Data
US 2021/0042559 A1    Feb. 11, 2021

Related U.S. Application Data

(60) Provisional application No. 62/762,292, filed on Apr. 27, 2018.

(51) Int. Cl.
*G06V 10/82*    (2022.01)
*G06F 18/21*    (2023.01)
(Continued)

(52) U.S. Cl.
CPC .............. *G06V 10/82* (2022.01); *G06F 18/21* (2023.01); *G06F 18/21355* (2023.01);
(Continued)

(58) Field of Classification Search
CPC ...... G06V 10/82; G06V 10/454; G06F 18/21; G06F 18/21355; G06F 18/253;
(Continued)

(56) References Cited

U.S. PATENT DOCUMENTS

2016/0019434 A1*   1/2016   Caldwell .............. G06V 10/462
                                                                          345/474
2016/0174902 A1*   6/2016   Georgescu .......... G06V 10/454
                                                                          600/408
(Continued)

OTHER PUBLICATIONS

Huang et al., Gradient Feature Extraction for Classification-based Face Detection, Nov. 2003, ScienceDirect, vol. 36, pp. 2501-2511.*
(Continued)

*Primary Examiner* — John W Lee
(74) *Attorney, Agent, or Firm* — KDW FIRM PLLC

(57) ABSTRACT

The invention proposes a method of training a convolutional neural network in which, at each convolutional layer, weights for one seed convolutional filter per layer are updated during each training iteration. All other convolutional filters are polynomial transformations of the seed filter, or, alternatively, all response maps are polynomial transformations of the response map generated by the seed filter.

7 Claims, 2 Drawing Sheets

(a)

(b)

(c)

(51) Int. Cl.
*G06F 18/2135* (2023.01)
*G06F 18/2413* (2023.01)
*G06F 18/25* (2023.01)
*G06N 3/045* (2023.01)
*G06N 3/048* (2023.01)
*G06N 3/08* (2023.01)
*G06N 3/084* (2023.01)
*G06V 10/44* (2022.01)

(52) U.S. Cl.
CPC ........ *G06F 18/2414* (2023.01); *G06F 18/253* (2023.01); *G06N 3/045* (2023.01); *G06N 3/048* (2023.01); *G06N 3/08* (2013.01); *G06N 3/084* (2013.01); *G06V 10/454* (2022.01)

(58) Field of Classification Search
CPC ...... G06F 18/2414; G06N 3/048; G06N 3/08; G06N 3/084; G06N 3/045
See application file for complete search history.

(56) References Cited

U.S. PATENT DOCUMENTS

| | | | |
|---|---|---|---|
| 2016/0196480 A1 | 7/2016 | Heifets et al. | |
| 2016/0321784 A1 | 11/2016 | Annapureddy | |
| 2016/0350645 A1* | 12/2016 | Brothers | G06N 3/045 |
| 2016/0350648 A1 | 12/2016 | Gilad-Bachrach et al. | |
| 2017/0140270 A1* | 5/2017 | Mnih | G06N 3/08 |
| 2017/0200078 A1* | 7/2017 | Bichler | G06N 3/045 |
| 2017/0262737 A1 | 9/2017 | Rabinovich et al. | |
| 2017/0337749 A1* | 11/2017 | Nerurkar | G06F 3/017 |
| 2018/0129893 A1 | 5/2018 | Son | |
| 2018/0165571 A1* | 6/2018 | Tanabe | G06N 3/04 |
| 2019/0050716 A1 | 2/2019 | Barkan | |
| 2019/0065817 A1* | 2/2019 | Mesmakhosroshahi | G06V 20/698 |
| 2019/0197693 A1* | 6/2019 | Zagaynov | G06T 11/203 |

OTHER PUBLICATIONS

Huang et al., Gradient Feature Extraction for Classification-based Face Detection, Nov. 2003, ScienceDirect, vol. 36, pp. 2501-2511 (Year: 2003).*

Juefei-Xu, "Design of Weight-Learning Efficient Convolutional Modules in Deep Convolutional Neural Networks and its Application to Large-Scale Visual Recognition Tasks", Data Analysis Project (OAP). In: Machine Learning Department, Carnegie Mellon University, May 3, 2017. Retrieved on Jun. 23, 2019 from URL: <https://www.ml.cmu.edu/research/dap-papers/S17/dap-xu-felix-juefei.pdf>, 15 pages.

Philipp et al., "Nonparametric Neural Networks", Published as a Conference Paper at ICLR 2017. Retrieved from URL: <https://www.cs.cmu.edu/-jgc/publication/Nonparametric%20Neural%20Networks.pdf>. Retrieved on Jun. 23, 2019, 31 pages.

Prabhu, "Understanding of Convolutional Neural Network (CNN)—Deep Learning", Mar. 3, 2018. Retrieved on Jun. 23, 2019 from URL: <https://medium.com/@RaghavPrabhu/understanding-of-convolutional-neural-network-cnn-dee p-learning-99760835f148>, 7 pages.

International Search Report and Written Opinion of International Patent Application No. PCT/US2019/029619 dated Jul. 10, 2019, 7 pages.

International Search Report and Written Opinion for International Patent Application No. PCT/US2019/029635, dated Jul. 10, 2019, 6 pages.

* cited by examiner

POLYNOMIAL CONVOLUTIONAL NEURAL NETWORK WITH LATE FAN-OUT

RELATED APPLICATIONS

This application is a national phase filing under 35 U.S.C. § 371 claiming the benefit of and priority to International Patent Application No. PCT/US2019/029635, filed on Apr. 29, 2019, which claims the benefit of U.S. Provisional Patent Application No. 62/762,292, filed Apr. 27, 2018. The entire contents of these applications are incorporated herein by reference.

GOVERNMENT RIGHTS

This invention was made with government support under contract 2013JCXK005 awarded by the Department of Justice and contract N6833516C0177 awarded by NavAir. The government has certain rights in the invention.

BACKGROUND OF THE INVENTION

Applications of deep convolutional neural networks (CNNs) have been overwhelmingly successful in all aspect of perception tasks, ranging from computer vision to speech recognition and understanding, from biomedical data analysis to quantum physics. Many successful CNN architectures have evolved in the last few years, however, training these networks end-to-end with fully learnable convolutional tilters, as is standard practice, is very computationally expensive and is prone to over-fitting due to the large number of parameters. This is because, with a standard CNN, the weights for each convolutional filter for each layer in the network need to be learned for each instance of training data.

As such, it would be desirable to alleviate this issue, to reduce the computational intensiveness of the training process, by reducing the number of convolutional filters for which weights must be learned at each training step, without sacrificing the high performance delivered by a standard CNN.

SUMMARY OF THE INVENTION

To address this problem, disclosed herein is the polynomial convolutional neural network (PolyCNN), which is an approach to reducing the computational complexity of CNNs, while having the PolyCNN perform as well as a standard CNN.

In one embodiment of the invention, at each convolution layer, only one convolutional filter, referred to herein as the seed filter, is needed for learning the weights, and all the other convolutional filters are polynomial transformations of the seed filter. This is referred to as the "early fan-out" embodiment.

In a second embodiment of the invention, the seed filter could be used to generate a single response map, which is then transformed in to the multiple response maps desired to be input into the next layer via a polynomial transformation of the response map generated by the seed filter. This is referred to as the "late fan-out" embodiment.

Both the early and late fan-out embodiments allow the PolyCNN to learn only one convolutional filter at each layer, which dramatically reduces the model complexity. Parameter savings of at least 10×, 26×, 50×, etc. can be realized during the learning stage depending on the spatial dimensions of the convolutional filters (3×3, 5×5, 7×7 etc. sized filters respectively).

While being efficient during both training and testing, the performance of the PolyCNN does not suffer due to the non-linear polynomial expansion, which translates to richer representational power within the convolution layers. The PolyCNN provides on-par performance with a standard CNN on several on several well-known visual datasets, such as MNIST, CIFAR-10, SVHN, and ImageNet.

DETAILED DESCRIPTION OF THE INVENTION

Figure 1:
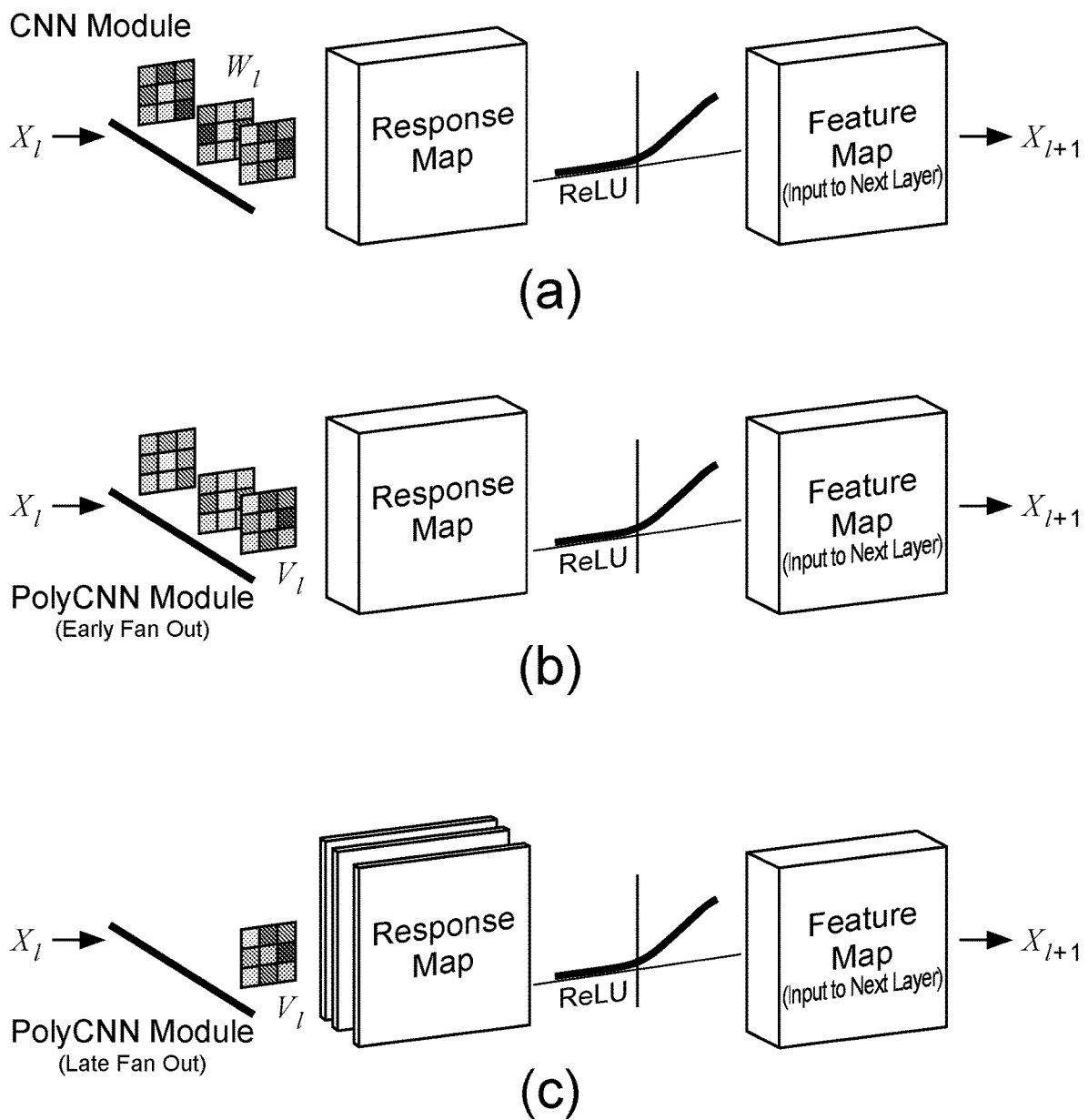
FIG. 1 is a schematic comparison of a single layer of a CNN in view (A), a single layer of a PolyCNN with early fan-Out, in view (B) and a single layer of a PolyCNN with late fan-out, in view (C).

The polynomial convolutional neural network (PolyCNN) is a weight-learning efficient variant of the traditional convolutional neural networks. The core idea of PolyCNN is that at each convolution layer, only one convolutional filter, referred to as the seed filter, needs to be learned, and other filters can be augmented by taking point-wise polynomials of the seed filter. The weights of these augmented filters need not to be updated during the network training. When convolved with the input data, the learnable seed filter and k non-learnable augmented filters result in (k+1) response maps. This embodiment is referred to as early fan-out.

Similarly, one can instead fan-out the seed response map generated from the convolution of the input with the seed convolutional filter to create (k+1) response maps by taking point-wise polynomials of the seed response map. This embodiment is referred to as late fan-out.

Early Fan-Out Embodiment (Filter Weights)

At any given layer, given the seed weights $w_i$ for that layer, many new filter weights are generated. The weights are generated via a non-linear transformation f(wt) of the weights. The convolutional outputs are computed as follows:

$$y = f(w) * x \quad (1)$$

$$y[i] = \Sigma_k x[i-k] f(w[k]) \quad (2)$$

where $x^j$ is the j-th channel of the input image and $w_i^j$ is the j-th channel of the i-th filter.

During the forward pass, weights are generated from the seed convolutional kernel and are then convolved with the inputs. During the backward pass, $$\frac{\partial l}{\partial w} \text{ and } \frac{\partial l}{\partial x}$$

need to be computed as follows:

$$\frac{\partial l}{\partial w[i]} = \sum_j \frac{\partial l}{\partial y[j]} \frac{\partial y[j]}{\partial w[i]} \quad (3)$$

$$= \sum_j \frac{\partial l}{\partial y[j]} \frac{\partial y[j]}{\partial f(w[i])} \frac{\partial f(w[i])}{\partial w[i]} \quad (4)$$

$$= \sum_j \frac{\partial l}{\partial y[j]} x[j-i] f'(w[i]) \quad (5)$$

-continued $$\frac{\partial l}{\partial w} = \left(\frac{\partial l}{\partial y} \star x\right) \odot f'(w) \quad (6)$$

For example, if the weights are transformed by a function $z[i]=f_j(w[i])=w[i]^j$ are then normalized to zero-mean and unit norm, $$\hat{w}[i] = \frac{z[i] - \frac{1}{n}\Sigma_i z[i]}{\left(\Sigma_i \left(z[i] - \frac{1}{n}\Sigma_i z[i]\right)^2\right)^{\frac{1}{2}}} \quad (7)$$

$$\frac{\partial \hat{w}[i]}{\partial w[i]} = \frac{\partial \hat{w}[i]}{\partial z[i]} \frac{\partial z[i]}{\partial w[i]}$$

$$\frac{\partial \hat{w}[i]}{\partial z[i]} = \frac{\left(1 - \frac{1}{n}\right)}{\left(\Sigma_i \left(z[i] - \frac{1}{N}\Sigma_i z[i]\right)^2\right)^{\frac{1}{2}}} - \frac{\left(1 - \frac{1}{n}\right)\left(z[i] - \frac{1}{n}\Sigma_j z[j]\right)}{\left(\Sigma_i \left(z[i] - \frac{1}{n}\Sigma_i z[i]\right)^2\right)^{\frac{3}{2}}} \quad (8)$$

$$\frac{\partial z[i]}{\partial w[i]} = f'(w[i]) = jw[i]^{j-1} \quad (9)$$

The gradient can now be computed with respect to input x as follows:

$$\frac{\partial l}{\partial x[i]} = \sum_j \frac{\partial l}{\partial y[j]} \frac{\partial y[j]}{\partial x[i]} = \sum_j \frac{\partial l}{\partial y[j]} f(w[j-i]) \quad (10)$$

$$\frac{\partial l}{\partial x} = \frac{\partial l}{\partial y} * f(w) \quad (11)$$

The resulting response maps from these weights are then combined using 1×1 convolutions into a one or more feature maps, which can then be stacked and used as the input for the next layer, where the process repeats.

Late Fan-Out Embodiment (Response Maps)

At any given layer, a plurality of augmented response maps can be computed from the seed response maps via non-linear transformations of the seed response map. The forward pass for this layer involves the application of a non-linear function: $z[i]-f_j(x[i])$. The backward propagation can be computed as:

$$\frac{\partial l}{\partial x[i]} = \frac{\partial l}{\partial z[i]} \frac{\partial z[i]}{\partial x[i]} = \frac{\partial l}{\partial z[i]} \frac{\partial f_j(x[i])}{\partial x[i]} \quad (12)$$

For example, if $$z[i]=f_j(x[i])=x[i]^j$$

then $$\frac{\partial l}{\partial x[i]} = \frac{\partial l}{\partial z[i]}(jx[i]^{j-i})$$

To prevent the gradients from vanishing or exploding, it is important to normalize the response maps. Batch normalization may be used.

Design of the Basic PolyCNN Module

The core idea of the PolyCNN (assuming that the convolutional filter does not have bias terms) is to restrict the network to learn only one convolutional filter at each layer, and through polynomial transformations, augmenting the seed convolutional filter, or the seed response map to generate augmented convolutional filters or augmented response maps respectively. The augmented filters do not need to be updated or learned during the network backpropagation. As shown in view (B) of FIG. 1, the early fan-out module of PolyCNN starts with just one learnable convolutional filter $V_l$ which is referred to as the seed filter. If m filters in total are desired for one layer, the remaining m−1 filters are non-learnable and are the polynomial transformation of the seed filter $V_l$. The input image $x_l$ is filtered by these convolutional filters and becomes m response maps, which are then passed through a non-linear activation function, such as a rectified linear unit (ReLU) function and become m feature maps. Optionally, these m feature maps can be further lineally combined using m learnable weights, which is essentially another convolution operation with filters of size 1×1.

A comparison of a standard CNN, an early fan-out embodiment of the PolyCNN and a late fan-out embodiment of the PolyCNN is shown in FIG. 1, views (A)-(C) respectively. Compared to the standard CNN module under the same structure (with 1×1 convolutions), the number of learnable parameters is significantly smaller in either embodiment of the PolyCNN.

Assume that the number of input and output channels are p and q. Therefore, the size of each 3D filter in both CNN and PolyCNN is p·h·w, where h and w are the spatial dimensions of the filter, and there are m such filters. The 1×1 convolutions act on the in filters and create the q-channel output.

For standard CNN, the number of learnable weights is p·h·w·n+m·q. For PolyCNN, the number of learnable weights is p·h·w·1+m·q. For simplicity, assume p=q, which is usually the case for a multi-layer CNN architecture. q is the number of intermediate channels because it is both the number of channels from the previous layer and the number of channels for the next layer. Then we have the parameter saving ratio:

$$\tau = \frac{\text{\# of param. in CNN}}{\text{\# of param. in PolyCNN}} = \frac{p \cdot h \cdot w \cdot m + m \cdot q}{p \cdot h \cdot w \cdot 1 + m \cdot q} = \frac{h \cdot w \cdot m + m}{h \cdot w + m} \quad (13)$$

and when the spatial filter size h=w=3 and the number of convolutional filters desired for each layer m>>3², the parameter saving ratio $$\tau = \frac{10m}{m+9} \approx 10.$$

Similarly, for spatial filter size h=w=5 and m>>5², the parameter saving ratio $$\tau = \frac{26m}{m+25} \approx 26$$

and for spatial filter size h=w=7 and m>>7², the parameter saving ratio $$\tau = \frac{50m}{m+49} \approx 50.$$

If the 1×1 convolutions are not included for both standard CNN and PolyCNN, thus making m=q=p, it can be verified that the parameter saving ratio τ becomes m. Numerically, PolyCNN saves around 10×, 26×, and 50× parameters during learning for 3×3, 5×5, and 7×7 convolutional filters respectively. The aforementioned calculation also applies to the late fan-out embodiment of the PolyCNN.

Training of the PolyCNN

Training of the PolyCNN is quite straightforward, where the backpropagation is the same for the learnable weights and the augmented weights that do not update. Gradients get propagated through the polynomial augmented filters just like they would with learnable filters. This is similar to propagating gradients through layers without learnable parameters (e.g., ReLU, Max Pooling etc.). However, the gradient with respect to the augmented filters are not computed nor updated during the training process.

The 3D non-learnable filter banks of size p×h×w×(m−1) (assuming a total of m filters in each layer) in the PolyCNN can be generated by taking polynomial transformations from the seed filter, by raising to some exponents, which can either be integer exponents or fractional exponents that are randomly sampled from a distribution.

The advantages of the proposed PolyCNN over CNN from several aspects is now discussed.

Computational:

The parameterization of the PolyCNN layer reduces the number of learnable parameters by a factor of 10× to 50× during training and inference. The lower memory requirements enable learning of much deep neural networks thereby allowing better representations to be learned through deeper architectures. In addition, PolyCNN enables learning of deep CNNs on resource constrained embedded systems.

Statistical:

PolyCNN, being a simpler model with fewer learnable parameters compared to a CNN, can effectively regularize the learning process and prevent over-fitting. High capacity models such as deep CNNs with a regular convolution layer typically consists of a very large number of parameters. Methods such as Dropout, DropConnect and Maxout have been introduced to regularize the fully connected layers of a network during training to avoid over-fitting. As opposed to regularizing the fully connected layers of a network, PolyCNN directly regularizes the convolution layers.

Figure 2:
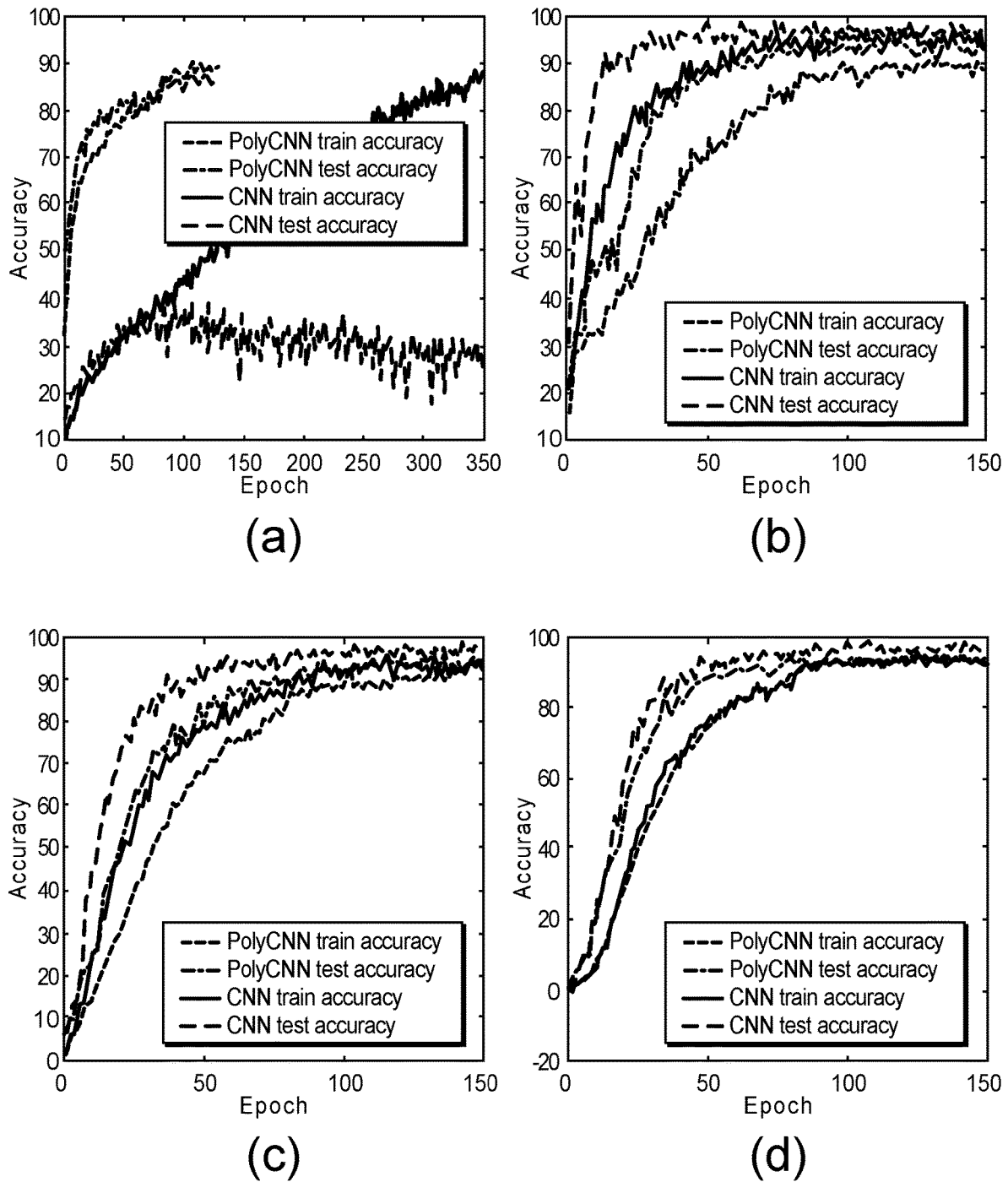
FIG. 2 shows graphs comparing the performance of a standard CNN and the PolyCNN of the present invention.

Sample Complexity:

The lower model complexity of PolyCNN makes it an attractive option for learning with low sample complexity. To demonstrate the statistical efficiency of PolyCNN, a benchmark was performed on a subset of the CIFAR-10 dataset. The training subset randomly picks 25% images (5000×0.25=1250) per class while keeping the testing set intact. The best-performing architecture on CIFAR-10 was chosen for both the CNN and PolyCNN. The results, shown in view (A) of FIG. 2. demonstrate that PolyCNN trains faster and is less prone to over-fitting on the training data.

To provide an extended evaluation, additional face recognition was performed on the FRGC v2.0 dataset experiments under a limited sample complexity setting. The number of images in each class ranges from 6 to 132 (51.6 on average). While there are 466 classes in total, the total number of randomly selected classes was increased (10, 50 and 100) with a 60-40 train/test split. Across the number of classes, the network parameters remain the same except for the classification fully connected layer at the end. Results are shown in views (B)-(D) of FIG. 2: (1) PolyCNN converges faster than CNN, especially on small datasets; and (2) PolyCNN outperforms CNN on this task. Lower model complexity helps PolyCNN prevent over-fitting especially on small to medium-sized datasets.

The invention proposed the use of PolyCNN as an alternative to the standard convolutional neural networks. The PolyCNN module enjoys significant savings in the number of parameters to be learned at training, at least 10× to 50×. PolyCNN also has much lower model complexity compared to traditional CNN with standard convolution layers. The proposed PolyCNN demonstrated performance on par with the state-of-the-art architectures on four image recognition datasets.

We claim:

1. A method for training a neural network comprising, for each convolution layer in the neural network:
   receiving a gradient function;
   adjusting a convolutional filter based on the gradient function;
   receiving an input;
   convolving the convolutional filter with the input to generate a seed response map;
   generating a plurality of augmented response maps based on the seed response map, wherein each element of each augmented response map is generated by applying a polynomial to one or more elements of the seed response map; and
   generating a plurality of feature maps by applying an activation function to the seed response map and to each of the plurality of augmented response maps.

2. The method of claim 1 further comprising:
   applying a vector of learnable coefficients to the plurality of feature maps to generate a single feature map.

3. The method of claim 2 wherein:
   m feature maps are generated from the seed response map and m−1 augmented response maps; and
   the vector contains m learnable coefficients.

4. The method of claim 2 further comprising:
   adjusting the m learnable coefficients based on the gradient function.

5. The method of claim 4 wherein the single feature map is generated at layer l of the neural network, further comprising:
   using the single feature map as the input for layer l+1 of the neural network.

6. The method of claim 1 wherein generating a plurality of augmented response maps comprises raising each element of the seed response map to a different exponent.

7. The method of claim 6 wherein the different exponents are integer exponents or fractional exponents randomly sampled from a distribution.

* * * * *